Oct. 5, 1948.  C. Y. CHITTICK  2,450,716
KITCHEN UTENSIL
Filed Dec. 16, 1944  2 Sheets-Sheet 1
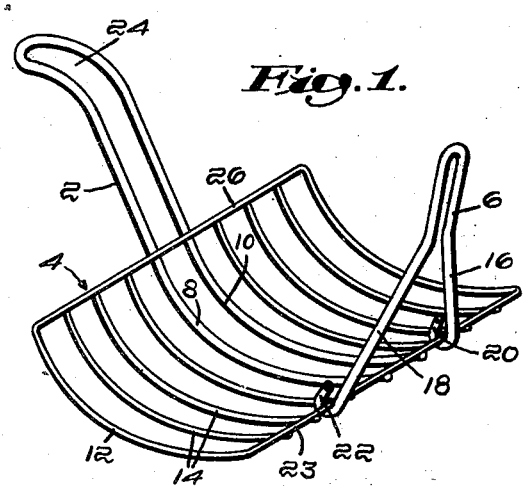
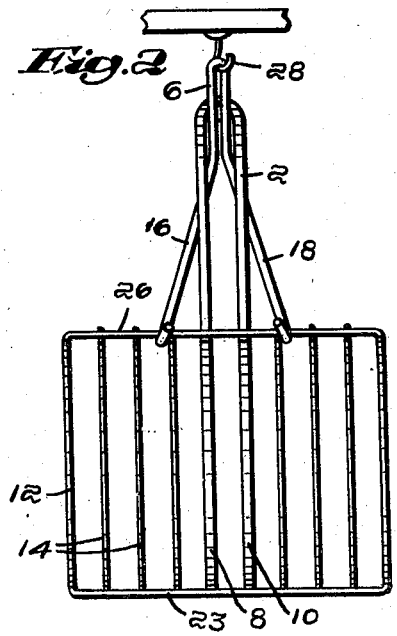
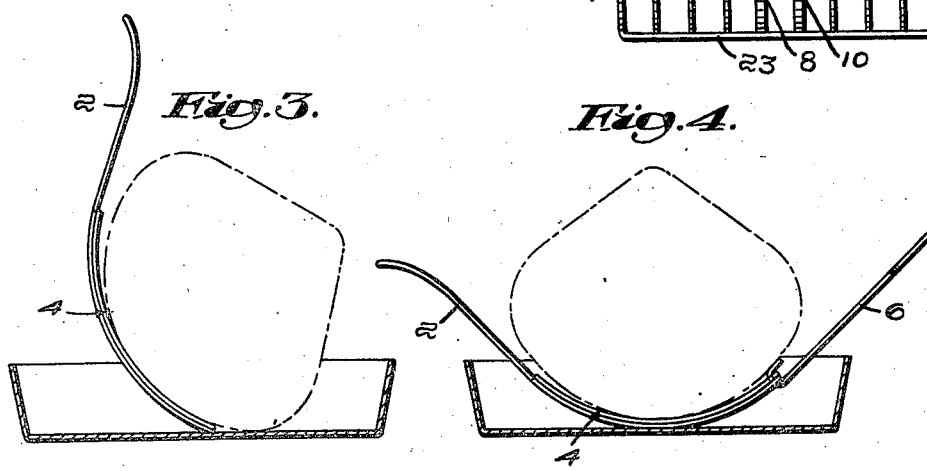
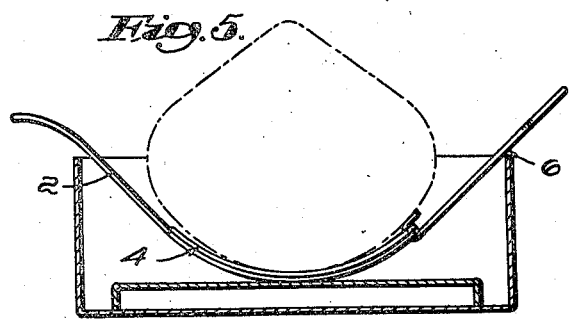
Inventor:
Charles Yardley Chittick Oct. 5, 1948.  C. Y. CHITTICK  2,450,716
KITCHEN UTENSIL
Filed Dec. 16, 1944  2 Sheets-Sheet 2

Inventor:
Charles Yardley Chittick

Patented Oct. 5, 1948

2,450,716

UNITED STATES PATENT OFFICE 2,450,716

KITCHEN UTENSIL

Charles Yardley Chittick, Waban, Mass.

Application December 16, 1944, Serial No. 568,437

1 Claim. (Cl. 294—1)

This invention relates to kitchen utensils.

The invention is particularly concerned with providing a kitchen utensil which will facilitate the lifting and moving of various types of food. The invention has been found particularly useful for lifting a cooked chicken, turkey, or other fowl from a roasting pan to the platter on which it will be served.

The invention may also be used in connection with lifting and moving other types of food, such as roasts and fish, particularly large fish, which, if unsupported throughout their entire length when moved, are likely to break apart.

The invention may be economically manufactured and may be conveniently stored in the kitchen ready for instant use.

In the drawings:

Fig. 1 shows a perspective view of the preferred form of the invention with the detachable handle in connected position.

Fig. 2 shows the invention as it may be conveniently stored, with one handle disconnected.

Fig. 3 illustrates the method of positioning the food on the utensil.

Fig. 4 shows the utensil in position for lifting the food from a pan.

Fig. 5 shows the utensil when used with a deep pan having a false bottom.

Figure 6:
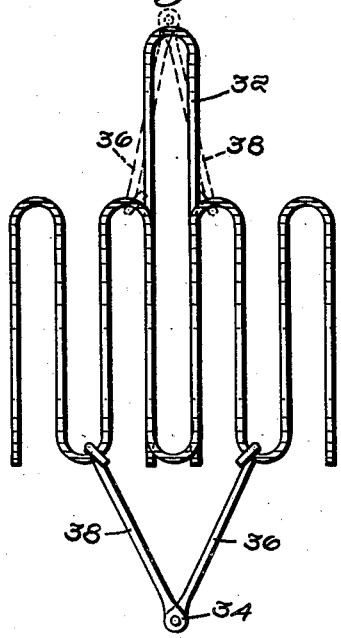

Figs. 6, 7, 8, and 9 show modified forms of the invention.

Referring to Fig. 1, it will be seen that the utensil comprises a handle 2 which is connected to a supporting grill-like framework generally referred to at 4. A detachable handle 6 is connected to the opposite side of the framework. In the particular construction disclosed, the handle 2 consists of a U-shaped bar or wire of sufficient strength, the ends of which form a pair of legs which continue across the framework at 8 and 10 to form part of the supporting structure. The support 4 comprises a rectangular outer frame 12, secured to legs 8 and 10 by soldering, welding, riveting, or in any other convenient manner, and a plurality of parallel bars or wires 14, which extend from one side to the other of frame 12 in the manner shown.

The particular outline of frame 12 is relatively immaterial, so long as it includes an area large enough to support the fowl, meat, or fish which the utensil is to lift. The number of crossbars 14 also may be varied, provided there are enough to give the strength necessary to carry the weight imposed on the utensil and to give such close support to the food to be lifted as to eliminate any possibility of the bars 14 cutting into the food or of the food being broken or falling through.

A detachable handle 6 is provided and this consists of an inverted Y-shaped member having legs 16 and 18 with their extremities turned to form hooks 20 and 22. These hooks are shaped to engage side 23 of frame 12 opposite handle 2. It is preferred that the hooks 20 and 22 be spaced apart to insure the center of gravity of the article to be lifted remaining within the confines of the carrying handles. This removes any tendency of the utensil to tip endwise.

Since it is necessary in the use of the utensil that handle 6 be entirely disconnected from the frame at the time the food is being placed on the frame, it will be appreciated that there is some likelihood that the detachable handle might become lost during those periods when the utensil is not in active use. To minimize this possibility, the detachable handle has been constructed in such manner that the utensil will normally be stored in the manner shown in Fig. 2, which will tend to insure both parts being available when the lifter is next used. Thus, the outer end of handle 6 is of such dimension that it may be passed through the opening 24 of handle 2, and handle 6 is of such length that when the hooks 20 and 22 are connected to bar 26 of the frame 12, the upper end of handle 6 will extend beyond the end of handle 2. Thus the two handles are interlocked, and when handle 6 is hung from a hook 28, as shown in Fig. 2, the entire utensil will be stored in a manner that will keep the parts together.

The manner of utilizing the invention is disclosed in Figs. 3, 4, and 5. If, for example, it is desired to move a turkey from a pan after roasting, the bird will be pushed to one side of the pan, then rolled toward the other side sufficiently far so that the end of the lifter may be inserted under the bird in the manner shown in Fig. 3. The handle 2 of the lifter is then lowered to the position shown in Fig. 4 and the bird is righted at the same time, so that the lifter and bird together assume the position shown in Fig. 4. In performing this operation, the necessary force applied against the bird is negligible, so that its skin remains intact and undamaged. The lifter may be slid laterally of the pan without damaging the fowl, as bars 14 act as skids. The detachable handle 6 is then hooked on to the bar 23 of frame 12 in the manner shown in Fig. 4, with the hooks 20 and 22 spaced along the frame as shown in Fig. 1. The bird may then be readily lifted from the pan without any damage whatsoever to the skin, and without any danger of being dropped. It may be suspended momentarily over the pan in order that any gravy may drain away and may then be transported safely to the receiving surface.

To remove the bird from the lifter, the previously recited steps are reversed. Handle 6 is removed, the supporting grill is slid to one side, and handle 2 is raised, causing the bird to be simultaneously rotated to the position in Fig. 3. Then the lifter is removed and the bird is rotated back to vertical position.

The construction shown in Fig. 5 is merely to illustrate that the curvature of the lifting frame is sufficient to permit its use with deep pans and with pans having raised or false bottoms. It will be understood, of course, that while the operation of the device has been described in particular connection with a turkey, it may be used equally well with other types of fowl, as well as with meats such as heavy roasts and with fish of any size. It will further be understood that in using the lifter, it is never necessary to slide it under the food, so that there is no possibility of damage to the food surface. As previously set forth, the lifter is merely placed under the food as far as possible, and then by rotating the lifter and the food simultaneously, the far side of the lifter will be exposed for connection with the detachable handle 6.

The framework or grill is constructed ordinarily of wire of any desired cross section, but it will be understood that the invention contemplates a utensil made of wood or molded plastic or any other suitable material.

Modifications of the invention are shown in Figs. 6, 7, 8 and 9. In Fig. 6 the supporting grill is formed of a single piece of wire bent transversely in a series of reverse curves. The size may be adjusted to the food to be lifted. A handle 32 is permanently secured to the under side of the grill, and a detachable handle 34, consisting of a pair of pivoted legs 36 and 38 with hooked ends is hooked in place on the other side of the grill.

The length of legs 36 and 38 is such that when the handle assumes the position shown in dotted lines in Fig. 6, the upper end of handle 34 will extend beyond the upper end of handle 32, so that the unit may be stored in the same manner as shown in Fig. 2.

Figure 7:
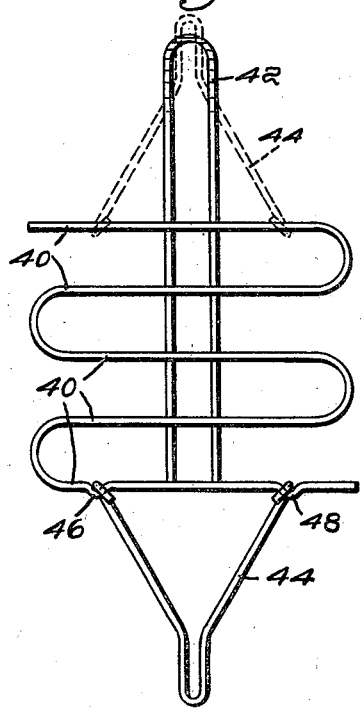

Another modification is shown in Fig. 7. Here the supporting grill is formed of a single piece of wire bent to form a series of longitudinally extending bars 40. The length and number of these bars will be adjusted to the size of the food to be lifted. A handle 42 is permanently secured to the under side of bars 40 as shown, while a detachable handle 44, having hooked ends, is connected to the outermost bar 40. The ends of handle 44 are spread so that tilting of the lifter will be minimized. Two deformed portions 46 and 48 in bar 40 are provided for locating handle 44 on bar 40. When it is desired to store the utensil, handle 44 is removed and hooked on to the other side of the bar in the position shown in the dotted line. The end of handle 44 is long enough to extend beyond the end of handle 42.

Figure 8:
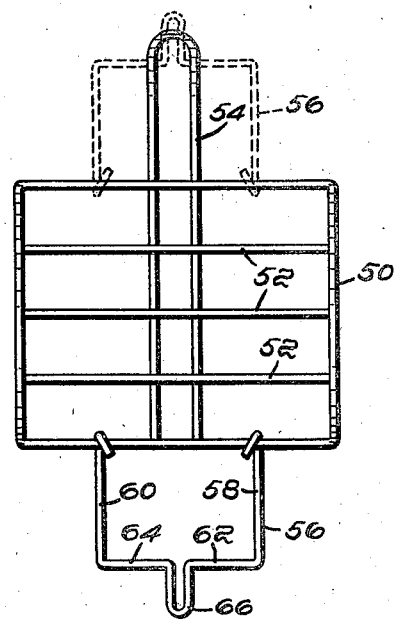

Another modification is shown in Fig. 8. In this form the supporting grill consists of an outer frame 50 having a series of longitudinally extending bars 52, which are strong enough and in sufficient number properly to support the food. The handle 54 is permanently affixed to the grill in the position and manner shown, and a detachable handle 56, which has parallel side members 58 and 60 on each end connecting with transverse bars 60 and 64. These in turn terminate in a U-shaped handle at 66. This form of detachable handle provides a somewhat better grip for the hand, inasmuch as all of the fingers may be used to grip the bars 62 and 64. When the utensil is stored, the detachable handle may be connected to the other section in the manner shown in the dotted lines.

Figure 9:
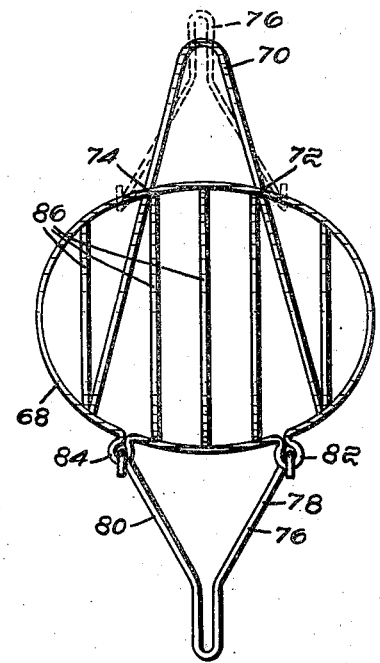

Another modification of the invention is shown in Fig. 9. In this construction the supporting grill has an oval outer frame 68. The handle 70, which is permanently affixed to the grill, has diverging leg members which results in the soldered connections at 72 and 74 being farther apart than in the earlier described forms. The detachable handle 76 connects with frame 68 at points spaced approximately as far apart as points 72 and 74. This assists in supporting the grill against tipping, as it enlarges the area over which the center of gravity of the food should be positioned.

To facilitate the connection of hooks 78 and 80 of detachable handle 76 to the frame 68, a pair of eyes 82 and 84 are provided. These eyes lie in the plane of the grill and in no way interfere with the positioning of the grill under the food, as the food will be rolled thereon in the usual manner. The remaining supporting structure may consist of a plurality of bars 86, secured to the frame 68 in the manner already described. In this construction, as well as in the other forms, the detachable handle 76 may be removably connected to the other side in the manner shown by the dotted lines, when the utensil is stored.

In all of the forms shown, the detachable handle is indicated as being somewhat longer than the permanently affixed handle, so that, in storing the lifter, the unit will normally be hung from the detachable handle. It will be understood, however, that the two handles could be the same length, so that both the permanent handle and the detachable handle may simultaneously engage the same hook, or the detachable handle may be shorter than the fixed handle, so long as means is provided whereby one portion of the utensil will be connected to and supported by the other portion that is suspended from the fixed carrier, such as a hook, nail, or screw eye.

While the handles of the various species shown have been constructed of wire, it is intended that the handles may be made of other forms of material, as, for example, strips of sheet metal, one of which may be rigidly affixed to one side of the grill and the other of which may have suitable hooks at the end to provide the detachable characteristic. In cases where sheet metal is used for the handles, a hole may be punched through one to permit the introduction of the other handle when the unit is in demounted condition.

Similarly within the scope of the invention is the provision of any convenient means for interlocking or connecting the two handles to minimize the possibility of loss when the utensil is stored.

While the preferred forms of the invention have been shown and described, it will be understood that I do not intend to be limited thereby, but only by the appended claim.

I claim:

A kitchen utensil for lifting food comprising two parts, one part comprising a curved grill-like frame having a straight blunt edge, said frame curving upwardly from said edge sharply enough to permit positioning in a cooking pan to receive food by rolling said food thereon without lifting, a first handle curved in the opposite direction from said frame and connected to the side of said frame opposite said blunt edge, the other part comprising a second handle having hooks adapted to be detachably connected to said blunt edge after food has been rolled on said frame.

CHARLES YARDLEY CHITTICK.

REFERENCES CITED

The following references are of record in the file of this patent:

UNITED STATES PATENTS

| Number | Name | Date |
| --- | --- | --- |
| 61,636 | Selkirk | Jan. 29, 1867 |
| 80,342 | Evinger | July 28, 1868 |
| 180,519 | Badger | Aug. 1, 1876 |
| 364,612 | Throckmorton | June 7, 1887 |
| 850,582 | Horton | Apr. 16, 1907 |
| 2,272,314 | Williams | Feb. 10, 1942 |